Sept. 19, 1944.     A. U. WELCH, JR     2,358,675
REACTOR
Filed June 28, 1941
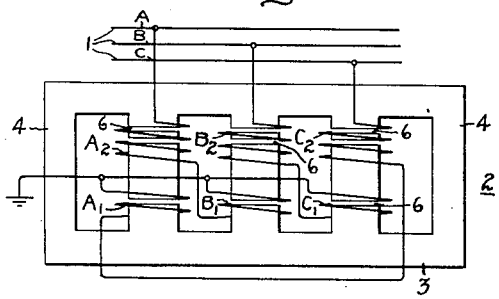
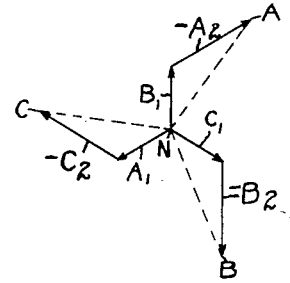
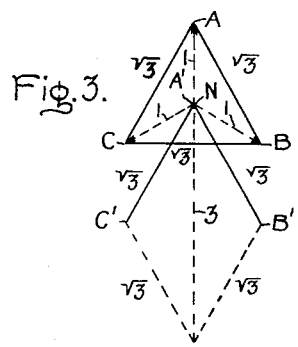
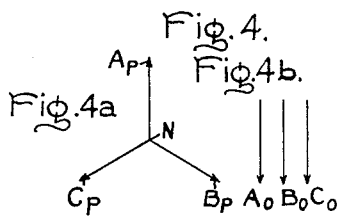
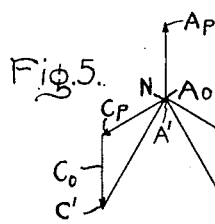
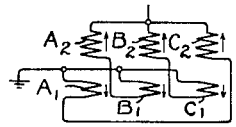
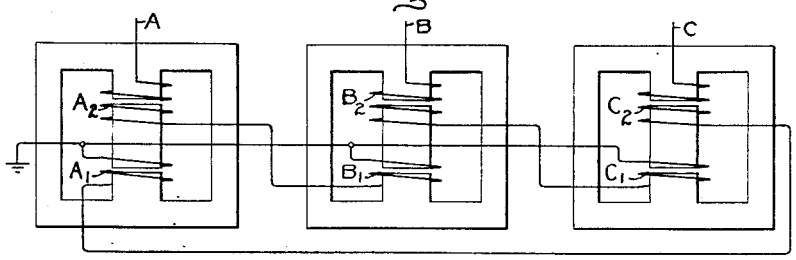
Inventor:
Alanson U. Welch Jr,
by Harry E. Dunham
His Attorney.

Patented Sept. 19, 1944

2,358,675

UNITED STATES PATENT OFFICE 2,358,675

REACTOR

Alanson U. Welch, Jr., Pittsfield, Mass., assignor to General Electric Company, a corporation of New York Application June 28, 1941, Serial No. 400,186

5 Claims. (Cl. 172—238)

This invention relates to reactors and more particularly to improvements in polyphase shunt reactor systems.

It is an improvement on Patent 2,034,518, granted March 17, 1936, on an application of F. H. Kierstead and assigned to the assignee of the present application. The Kierstead reactor is characterized by having predetermined and different positive sequence and zero sequence impedances. So long as a polyphase system is balanced or symmetrical about its neutral point it may be represented by a series of equal vectors which are symmetrical with respect to a neutral point and which are conceived of as rotating about that point in the positive or same sequence as the phase sequence of the system. Therefore, "positive sequence impedance" means the impedance to currents produced by such a symmetrical positive sequence voltage. When, however, a polyphase system is unbalanced or unsymmetrical with respect to the previously referred to neutral point and this unbalance is characterized by a residue, that is, it is such that the vector sum of the system quantities does not equal zero, then this residue is said to constitute a zero sequence system consisting of as many vectors as there are phases in the system, all of which are in phase with each other and all of which are of the same magnitude, this magnitude being the magnitude of the residue divided by the number of phases. As all the zero sequence vectors are in phase with each other, they do not have a phase sequence and it is for this reason that they are called zero sequence components.

An unbalance between vectors which results in a residue usually accompanies a ground fault on a polyphase system because this ground fault either shifts the polyphase voltage diagram with respect to the neutral so that the various phase-to-neutral voltages no longer added up to zero or else the ground current, which does not return through the conductors of the system but returns through ground, represents a residue current. A zero sequence voltage applied to a polyphase reactor system is therefore the equivalent of a single phase voltage impressed across all of the phases of the reactor system connected in parallel.

In the Kierstead patent the positive sequence reactance of the reactor is controlled by suitable non-magnetic gaps in the winding legs of the reactor. These control the reluctance of the polyphase reactor core and in this way control the reactance. The zero sequence reactance is controlled by non-magnetic gaps in auxiliary or return path core legs on the reactor. These auxiliary legs are necessary because as the zero sequence flux is equal and in phase in all the winding legs of the core it cannot return through these winding legs as is the case in a balanced or positive sequence polyphase system in which there is no residue and all the individual phase fluxes added up to zero. Consequently, controlling the reluctance of the auxiliary legs of the core controls the zero sequence reactance. However, the non-magnetic gaps in the auxiliary legs cause a substantial amount of flux leakage which it has been found enters the metal tank or casing of the reactor and causes eventually such overheating as to destroy the reactor. In order to prevent this, Kierstead employs a magnetic shield interposed between the reactor core and the surrounding tank or casing. This shield is of low resistance material, such as copper, and prevents the leakage flux from forming eddy currents in the reactor casing.

In accordance with the present invention a special zigzag winding is employed. This winding is characterized by having the turns of the zig and zag portions of the winding unequal. As will be explained hereafter, this automatically causes the zero sequence reactance to be different from the positve sequence reactance so that it is unnecessary to provide non-magnetic gaps in the auxiliary legs of the reactor and this in turn makes it unnecessary to employ a magnetic shield. Furthermore, by means of this arrangement it is possible to interconnect a plurality of single-phase reactors and produce a polyphase reactor system which has a zero sequence reactance which is different from the positive sequence reactance.

An object of the invention is to provide a new and improved polyphase reactor system.

Another object of the invention is to provide a simple and improved reactor system having substantially different positive sequence and zero sequence reactances.

A further object of the invention is to provide a polyphase reactor system comprising a plurality of interconnected single phase reactors which is characterized by a zero sequence reactance which is different from the positive sequence reactance.

The invention will be better understood from the following description taken in connection with the accompanying drawing and its scope will be pointed out in the appended claims.

In the drawing Fig. 1 illustrates a three-phase reactor constructed in accordance with my invention and connected in shunt circuit relation to a three-phase circuit, Fig. 2 is a vector diagram of the voltages existing in the elements in Fig. 1, Fig. 3 is a vector diagram illustrating the unbalance produced in a three-phase voltage system by the grounding of one of the phases, Fig. 4 illustrates the symmetrical positive sequence and zero sequence components of the unbalanced system shown in Fig. 3, Fig. 5 illustrates how the components shown in Fig. 4 combine to produce the unbalanced system shown in Fig. 3, Fig. 6 shows the equivalent winding diagram of the reactor 1 with respect to the zero sequence voltage, and Fig. 7 illustrates the interconnection of three single-phase reactors to produce a reactor system which is equivalent to that of Fig. 1.

Referring now to the drawing and more particularly to Fig. 1, there is shown therein a three-phase circuit 1 across which is connected a three-phase reactor 2. This reactor has a magnetic core 3 consisting of two yokes interconnected by three inner winding legs and two outer or return path legs 4. Each winding leg carries two windings. The windings $A_1$, $B_1$ and $C_1$ all have the same number of turns and the windings $A_2$, $B_2$ and $C_2$ all have the same number of turns but the latter number of turns is different from the former number of turns. These windings are interconnected to form a three-phase zigzag winding. As shown more clearly in Fig. 2, the voltage between neutral and conductor A of the three-phase circuit is made up of the vector sum of the voltages of the windings $B_1$ and $A_2$, the voltage to neutral of the conductor B of the main circuit is made up of the vector sum of the voltages of the windings $C_1$ and $B_2$, and similarly the voltage to neutral of the conductor C of the main circuit is made up of the vector sum of the voltages of the windings $A_1$ and $C_2$.

The winding legs of the reactor are provided with suitable non-magnetic gaps 6 for giving the reactor the desired amount of positive sequence reactance. For example, this reactance may be such as to produce a predetermined amount of compensation for the capacitive reactance to ground of the conductors of the main circuit 1. The neutral point of the zigzag connection is preferably grounded.

If the main circuit 1 does not have a grounded neutral of its own, for example, if it is energized by means of a delta-connected winding and it has no grounded neutral loads connected to it its voltage may be represented by the triangle ABC of Fig. 3. This voltage triangle will nevertheless have a definite neutral point N which is at ground potential, if for no other reason than that each of its three conductors is in effect connected to ground through its inherent capacitance to ground. It will be seen, therefore, that this constitutes a symmetrical system about the neutral point, the voltage to neutral of each of the conductors of the circuit being indicated by the dotted vectors. If now one of the conductors of the three-phase circuit should become grounded the system will become unsymmetrical with respect to neutral. For example, if conductor A should become grounded, the potential of conductor A is brought down to ground potential and all of the other voltages are correspondingly shifted so that the voltage to neutral of the ungrounded conductors B and C becomes B' and C'. The voltages B'N and C'N correspond to the line-to-line rather than the line-to-neutral voltages of the symmetrical system and are thus the $\sqrt{3}$ times higher than in the symmetrical system. This unsymmetrical system NB'C' may be thought of as consisting of two components shown respectively in Figs. 4a and 4b. Fig. 4a shows the so-called positive sequence components and they are exactly the same as the line-to-neutral voltages of the symmetrical system, shown in Fig. 3. Fig. 4b shows the zero sequence components, which are three equal and in-phase vectors $A_0$, $B_0$ and $C_0$, each of which is in phase with the residue of the system B' and C' and equal to one-third of this residue. The vector sum of B' and C' is equal to three times the leg voltage NA so that each of the three vectors $A_0$, $B_0$ and $C_0$ is equal to one-third of 3 or is equal to the leg voltage. As shown in Fig. 5, if the positive and negative sequence components are added vectorially they will produce the unsymmetrical system NB'C' so that the unbalance resulting from a ground on conductor A may be considered to produce in the system three in-phase voltages $A_0$, $B_0$ and $C_0$.

Fig. 6 shows, in effect, how the three-phase reactor of Fig. 1 appears to the zero sequence voltage. As shown, it consists of three parallel paths. Therefore, with respect to the zero sequence component, windings $A_1$ and $A_2$ produce opposite or bucking m.m.f.'s in their common winding leg and similarly windings $B_1$ and $B_2$, and $C_1$ and $C_2$ produce opposing m.m.f.'s in their respective winding legs. This means that the effective or net turns on each winding leg has been reduced so that, for example, with respect to the winding leg for phase A it becomes the difference between the turns in $A_2$ and $A_1$ instead of the vector sum of the turns in $A_2$ and $A_1$. This means that the reactance of the reactor has been materially decreased because in order to have the same induced voltage between neutral and each phase conductor it will be necessary to have an increased amount of flux in the winding legs. Therefore, the zero sequence reactance is less than the positive sequence reactance. Furthermore, as the flux is proportional to the net ampere-turns and as the voltage is proportional to the product of flux and net-turns the volt-amperes of the reactor will be proportional to the square of the flux so that, for example, if the flux is doubled the zero sequence volt-amperes will be four times the positive sequence volt-amperes.

It can be shown that if the two coils on each winding leg are both distributed along the leg the ratio of zero sequence reactance to positive sequence reactance is substantially equal to $$\frac{(1-R)^2}{(1+R+R^2)}$$

where R is the ratio of turns of the shorter of the two windings to the longer of the two windings, or as shown in the drawing, $$R = \frac{A_1}{A_2}$$

For example, if fifty per cent zero sequence reactance is required, the short winding must have 21% of the turns of the long winding.

A relatively low zero sequence reactance is desirable in order to provide sufficient current when a ground fault occurs so as to cause operation of protective relays. However, it is desirable that the zero sequence current should not be too high in order to prevent injury to the circuit in case the protective equipment should accidentally fail to operate automatically.

As the desired zero sequence reactance is now obtained merely by increasing the flux density in the winding legs, there is no necessity for gaps in the outer legs 4. Since there are no gaps in these outer legs, the magnetizing force in the outer legs is very small and no magnetic shield is required.

Fig. 7 shows how the unequal zig and zag type of zigzag winding may be applied to three single-phase reactors by interconnection between the reactors. So far as is known, this is the only way in which it is possible to make a group of single-phase reactors have a zero sequence reactance different from their positive sequence reactance. In this figure the windings are lettered to correspond with the windings in Fig. 1.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. A shunt reactor system for polyphase alternating-current circuits comprising, in combination, magnetic core means having a plurality of winding legs and at least one magnetic return path for each leg which is exclusive of the other legs, and a polyphase grounded neutral zigzag winding mounted on said winding legs, the zig and zag turns of said winding being substantially unequal.

2. The combination as in claim 1, in which the ratio R of zig to zag turns is less than unity such that $$\frac{(1-R)^2}{(1+R+R^2)}$$

equals a predetermined finite ratio of zero sequence impedance to positive sequence impedance.

3. The combination as in claim 1, in which there is at least one non-magnetic gap in each winding leg.

4. A shunt reactor system for polyphase alternating-current circuits comprising, in combination, a magnetic core comprising two yoke members interconnected by a plurality of winding legs and a plurality of return path legs, a plurality of non-magnetic gaps in each of said winding legs, and a polyphase grounded neutral zigzag winding mounted on said winding legs, the ratio of zig turns to zag turns having a value R which is substantially less than unity such that $$\frac{(1-R)^2}{(1+R+R^2)}$$

equals a predetermined finite ratio of zero sequence impedance to positive sequence impedance.

5. A shunt reactor system for polyphase alternating-current circuits comprising, in combination, a plurality of single-phase reactor cores, and a pair of unequal windings on each of said cores, said windings being interconnected to form a polyphase grounded neutral symmetrical zigzag winding, the ratio of zig turns to zag turns having a value R which is substantially less than unity whereby $$\frac{(1-R)^2}{(1+R+R^2)}$$

equals a predetermined finite ratio of zero sequence impedance to positive sequence impedance of said zigzag winding.

ALANSON U. WELCH, Jr.